United States Patent
Criel et al.

(10) Patent No.: US 8,268,212 B2
(45) Date of Patent: Sep. 18, 2012

(54) PROCESS FOR MANUFACTURING A PLASTIC HOLLOW BODY FROM A PARISON AND DIE FOR EXTRUDING A PARISON

(75) Inventors: Bjorn Criel, Sint-Martens-Lennik (BE); Philippe Bournonville, Floriffoux (BE); Pierre-Francois Tardy, Brussels (BE)

(73) Assignee: Inergy Automotive Systems Research (S.A.), Brussels (BE)

( * ) Notice: Subject to any disclaimer, the term of this patent is extended or adjusted under 35 U.S.C. 154(b) by 0 days.

(21) Appl. No.: 12/440,844

(22) PCT Filed: Oct. 3, 2007

(86) PCT No.: PCT/EP2007/060513
§ 371 (c)(1),
(2), (4) Date: Mar. 11, 2009

(87) PCT Pub. No.: WO2008/040766
PCT Pub. Date: Apr. 10, 2008

(65) Prior Publication Data
US 2010/0044927 A1    Feb. 25, 2010

(30) Foreign Application Priority Data
Oct. 5, 2006   (FR) .................................... 06 08761
Dec. 15, 2006  (FR) .................................... 06 10966

(51) Int. Cl.
*B29C 31/00* (2006.01)
(52) U.S. Cl. ........ 264/152; 264/531; 264/150; 264/151; 264/153
(58) Field of Classification Search .............. 264/531, 264/150–152
See application file for complete search history.

(56) References Cited

U.S. PATENT DOCUMENTS

| | | | |
|---|---|---|---|
| 3,325,638 A | | 6/1967 | Pfaff, Jr. et al. |
| 3,384,925 A | | 5/1968 | Rothemeyer |
| 4,624,821 A | * | 11/1986 | Younkin et al. ............. 264/532 |
| 4,777,006 A | * | 10/1988 | Wenger et al. ............. 264/526 |
| 5,057,267 A | | 10/1991 | Seizert et al. |
| 5,281,126 A | | 1/1994 | Terada et al. |

(Continued)

FOREIGN PATENT DOCUMENTS

DE       24 29 008       1/1976

(Continued)

OTHER PUBLICATIONS

PCT International Search Report dated Feb. 21, 2008 for International Application No. PCT/EP2007/060513 (3 p.).

(Continued)

*Primary Examiner* — Yogendra Gupta
*Assistant Examiner* — Amjad Abraham
(74) *Attorney, Agent, or Firm* — Oblon, Spivak, McClelland, Maier & Neustadt, L.L.P.

(57) ABSTRACT

Process for manufacturing a plastic hollow body, said process comprising the following steps:
a) a molten plastic parison is extruded, in an extruder, through a die;
b) at least one longitudinal cut is made in the parison;
c) the parison is introduced into a mold comprising two cavities; and
d) the hollow body is molded by conforming the parison to the mold cavities,
said die being equipped with a passage for the molten plastic which gradually modifies the shape of the parison so that it is substantially flattened on exiting.
Die suitable for implementing this process.

5 Claims, 3 Drawing Sheets

U.S. PATENT DOCUMENTS

| | | | |
|---|---|---|---|
| 2001/0015513 A1 | 8/2001 | Van Schaftingen et al. | |
| 2003/0164572 A1* | 9/2003 | Pappert et al. ................. | 264/150 |
| 2005/0104260 A1* | 5/2005 | Van Schaftingen et al. .. | 264/515 |
| 2006/0001197 A1* | 1/2006 | Kummer ........................ | 264/540 |
| 2006/0141184 A1* | 6/2006 | Rohde et al. .................. | 428/35.7 |
| 2006/0255514 A1* | 11/2006 | Krohn et al. ................... | 264/536 |

FOREIGN PATENT DOCUMENTS

| | | | |
|---|---|---|---|
| DE | 31 17 179 | | 11/1982 |
| DE | 4305624 A1 | | 8/1993 |
| DE | 10010900 A1 | | 9/2001 |
| DE | 102 31 866 | | 1/2004 |
| DE | 103 55 818 | | 6/2005 |
| EP | 1110697 A2 | | 6/2001 |
| EP | 1 334 817 | | 8/2003 |
| EP | 1 661 687 | | 5/2006 |
| EP | 1 897 672 | | 3/2008 |
| FR | 2879494 A1 | | 6/2006 |
| JP | 53121062 A | * | 10/1978 |
| JP | 55-101415 | | 8/1980 |
| JP | 61261021 A | | 11/1986 |
| JP | 62267105 A | | 11/1987 |
| JP | 6071644 A | | 3/1994 |
| JP | 06071644 A | * | 3/1994 |
| WO | WO 01/00433 | | 1/2001 |
| WO | WO2004007182 A1 | | 1/2004 |
| WO | WO 2005097464 A1 | * | 10/2005 |
| WO | WO2006008308 A1 | | 1/2006 |
| WO | WO2006032672 A1 | | 3/2006 |
| WO | WO2006064057 A2 | | 6/2006 |
| WO | WO2007000454 A1 | | 1/2007 |

OTHER PUBLICATIONS

"Measuring Layer Thickness in Fuel Tanks," Mahmud Al-Haj, et al., Kunststoffe plast Europe Mar. 2003, p. 64.

Walter Michaeli, "Extrusionswerkzeuge für Kunststoffe und Kautschuk—Bauarten, Gestaltung und Berechnungsmöglichkeiten," Carl Hanser Verlag München Wien, 1991, ISBN 3-446-15637-2, with partial English translation, pp. 149-151.

* cited by examiner

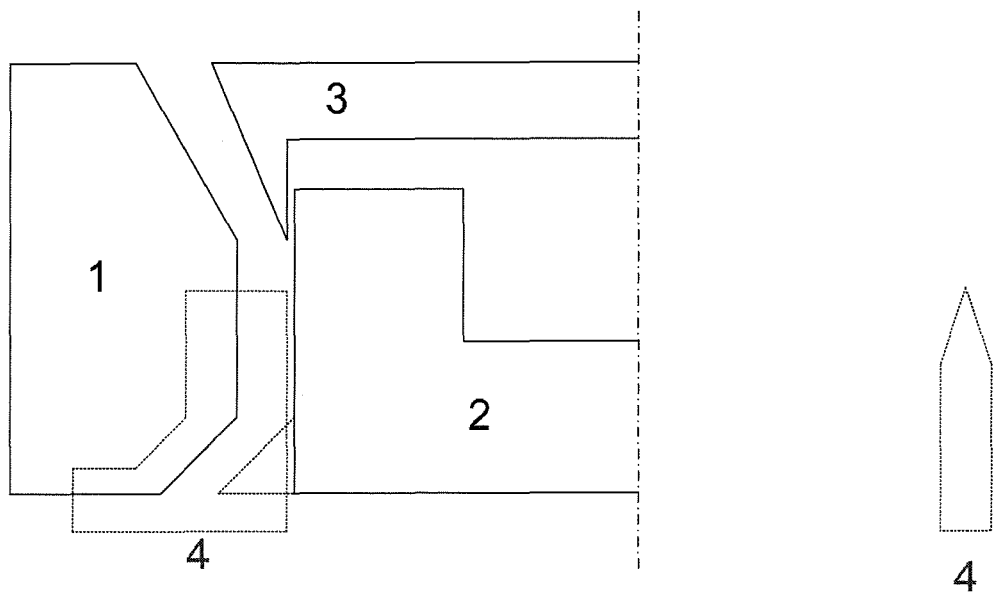
Fig. 1
Fig. 2
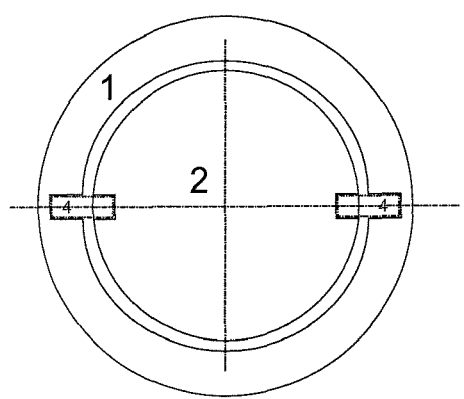
Fig. 3

PROCESS FOR MANUFACTURING A PLASTIC HOLLOW BODY FROM A PARISON AND DIE FOR EXTRUDING A PARISON

CROSS-REFERENCE TO RELATED APPLICATIONS

This application is a U.S. national stage application under 35 U.S.C. §371 of International Application No. PCT/EP2007/060513 filed Oct. 3, 2007, which claims priority to French Application No. 06.08761 filed Oct. 5, 2006 and to French Application No. 06.10966 filed Dec. 15, 2006, these applications being herein incorporated by reference in their entirety for all purposes.

BACKGROUND OF THE INVENTION

I. Field of the Invention

The present invention relates to a process for manufacturing a plastic hollow body, and in particular, a fuel tank, and this from a parison that is split or is in two parts. It also relates to a die for extruding a parison suitable for said process.

II. Description of Related Art

Fuel systems on board vehicles of various types generally comprise devices for the ventilation of hydrocarbons contained in the tank. They may also include devices for supplying the engine with fuel. Such devices form the link between elements contained in the tank (valves, fuel pump, etc.) and elements positioned outside the tank (canister, filling pipe, etc.). The penetration through the wall of the tank must take into account the sealing requirements laid down by current environmental standards (LEV II and PZEV for example). For this purpose, the reduction in the number and size of the openings in the wall of the tank constitutes a favourable factor in reducing evaporative losses. However, this makes it more difficult to insert components into the tank and position them therein.

Application EP 1110697 in the name of the Applicant discloses a process for moulding a fuel tank using a parison in several parts so as to be able to insert the accessories into the tank at the same time as it is moulded. For this purpose, a tubular parison is extruded, then, on exiting the die, two longitudinal cuts are made in it, along two opposing generatrices. This document recommends the use of a device for guiding and separating the two parison parts thus obtained, and this with a view to being able to introduce the accessories into the tank at the same time as it is moulded.

Ideally, this device should also make it possible to substantially flatten the two parison parts and keep them free of bends so as to be able to apply them correctly between the mould cavities. This may be carried out using straight cylindrical rollers or rolls, the separation of which is set at will. This simple (and theoretically adequate) technique has, however, the disadvantage that the sheets obtained on exiting the rolls remain, after all, curved and that their separation cannot be well controlled. This is because the plastic begins to set as soon as it exits the die and tends to remain in the shape that the die gives it.

BRIEF SUMMARY OF THE INVENTION

The object of the invention is therefore to provide a process which enables this problem to be solved, and this thanks to the use of a die which enables said parison to be substantially flattened before its exit, so that the sheets that result from cutting it have a lesser tendency to curve and form bends. In particular, in one variant, the die of the process according to the invention also makes it possible to cut the parison inside it, and this so as to prevent an often difficult initiation of the cutting and guiding of the sheets at the start of production runs and also the formation of bends due to the effect of cutting the sheets downstream.

For this purpose, the invention relates to a process for manufacturing a plastic hollow body, said process comprising the following steps:
a) a molten plastic parison is extruded, in an extruder, through a die;
b) at least one longitudinal cut is made in the parison;
c) the parison is introduced into a mould comprising two cavities; and
d) the hollow body is moulded by conforming the parison to the mould cavities, said die being equipped with a passage for the molten plastic which gradually modifies the shape of the parison so that it is substantially flattened on exiting.

The process according to the invention is suitable for any hollow body and, in particular, for any hollow body on the inside of which it is desired to introduce at least one accessory. It advantageously applies to the manufacture of fuel tanks. The expression "fuel tank" is understood to mean a leakproof tank, able to store fuel under diverse and varied usage and environmental conditions. An example of this tank is that with which motor vehicles are fitted.

The hollow body obtained by the process according to the invention is made with a plastic wall, generally comprising an internal face on its concave part and an external face on its convex part.

The term "plastic" is understood to mean any material comprising at least one synthetic polymer resin.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but non-limitingly: carbon, salts and other inorganic derivatives, natural or polymeric fibres. It is also possible to use multilayer structures composed of stacked and joined layers comprising at least one of the polymers or copolymers described above.

One polymer often used for fuel tanks is polyethylene. Excellent results have been obtained with high-density polyethylene (HDPE).

Preferably, the hollow body for which the process according to the invention is intended has a multilayer structure comprising at least one layer of a thermoplastic and at least one additional layer which, advantageously, may consist of a material that is a barrier to liquids and/or gases.

Preferably, the nature and the thickness of the barrier layer are chosen so as to minimize the permeability of the liquids and gases in contact with the wall of the hollow body. Preferably, in the case of a fuel tank, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The term "parison" is understood to mean an extruded preform of any shape, generally substantially cylindrical or tubular (which, according to the invention, is flattened in a die mounted on the head of the extruder), which is intended to form the wall of the tank after moulding, i.e. after an operation which consists in forming the parison, which is in the melt state, into the required shapes and dimensions using a mould, in order to obtain a tank from a single part.

According to the invention, this parison is extruded, i.e. derives from the melting and/or plasticization of the plastic in an extruder, then from its expulsion of this plastic through an extrusion head, which generally gives it a cylindrical shape. The expression "extrusion head" is understood to mean an assembly of metal blocks and a core comprising a passage for at least one stream of molten plastic exiting an extruder. Such an assembly generally comprises at least one block (or distributor) for distributing the material in the form of an annular stream, and in the case of a coextrusion head, it generally comprises at least one distributor per layer of material.

The distributor or distributors, where appropriate, have passing right through them an orifice of which the outlet end is generally substantially annular and which determines, with the core, an annular outlet flow area for the molten plastic. The stream of molten plastic which is fed by the extruder to the extrusion head is generally a solid cylindrical stream of pressurized plastic. In the case of a coextrusion head (intended for extruding multilayer structures), there are generally as many feed orifices as cylindrical streams of material.

According to the invention, the parison exiting the extrusion head is extruded through a die which gradually converts its (generally cylindrical) shape into a flattened, oblong shape. Subsequent cutting of this parison will then make it possible to obtain two "sheets" which will have a decreased tendency to curve and will therefore be easier to handle than the cylindrical half-parisons obtained in the processes of the prior art.

Preferably, the parison has a controllable thickness (i.e. one that can be varied, in a controlled manner, longitudinally (along a generatrix) and/or transversely (over a same section)) and this using at least one known device such as WDS (vertically displaceable core), PWDS (deformable ring), SFDR (machined core of variable profile or pin of variable shape) or "die slide" (part inserted locally into the die: see U.S. Pat. No. 5,057,267 in the name of the Applicant), integrated into the die. With respect to moulding a parison whose thickness is constant, this way of proceeding makes it possible to take into account the reduction in thickness which occurs during moulding (and in particular, blow moulding) at certain places in the parison, as a result of the non-constant deformation rates of the material in the mould.

According to one preferred variant, the longitudinal cutting of the parison is carried out in the extrusion die, and this in order to automate the process as much as possible and facilitate the stops/starts of production runs. In this variant, preferably, the parison is first cut using flow dividers integrated into the die and then the two cut parts of the parison are gradually flattened due to a gradual modification of the inner passage of the die through which the stream or streams of plastic of the parison flow.

In this variant, it is advantageous that the flow dividers be extended to the die outlet and have a suitable shape for keeping the cut parison parts separated, or even increasingly separated (for example: to separate them at the same distance apart as the cavities of the subjacent mould). According to one particularly advantageous variant, in the process according to the invention, the flow dividers have a suitable shape and location to contribute, with the shape of the passage through the die, to converting the two semi-cylinders into substantially flat sheets. In the remainder of the document the term "sheets" will generally be used for the substantially flattened parison pieces.

Most particularly preferably, the die of the process according to the invention (and particularly: according to the aforementioned variant) is also equipped with a device enabling the transverse cutting of the parison (or of the sheets) to obtain pieces of parison (or discontinuous sheets) which may then be moulded. This cutting operation may take place by relative movement of the core and the mantle of the die, so as to momentarily interrupt the flow of material and therefore cut the parison. Alternatively, it is possible to deposit under the die (or optionally integrate into its lower surface), hooks or blades to carry out this cutting operation.

When sheets that are already cut and partially flattened are obtained at the die outlet, their handling and their transfer to the mould are markedly easier than in the processes of the prior art. It is therefore possible to reduce the height required between the die outlet and the mould cavities. This will reduce the dwell time of the extruded material in the ambient air and thus will increase the temperature of the sheets, which will facilitate the subsequent moulding process, in particular when this comprises a step of attaching component(s) (accessory or accessories) to the inside of the parison, onto its inner face, before finally moulding the hollow body. Such an attachment of components, which is advantageous within the scope of the present invention, is for example described in Applications WO 2006/008308, WO 2006/032672 and PCT/EP2006/063590 in the name of the Applicant and of which the content is, for this purpose, incorporated by reference in the present application.

The transfer of the sheets to the mould may take place in any known manner. However, according to one preferred variant, the mould cavities are positioned underneath the die and the parison (sheets) is/are extruded continuously between the cavities of the mould, that is then closed over said sheets just before they are cut transversely and moulded.

However, in this variant, the free end of the sheets (which hangs by gravity between the mould cavities) has a tendency to warp, in particular when the sheets have a variable thickness as recommended below. Therefore, according to one most particularly preferred variant, this end (or rather: this pair of sheet ends) is guided by jaws or hooks (preferably made of metal that is cooled or coated with PTFE for example) that make it possible to flatten them and to prevent the formation of bends.

In the process according to the invention, the tank is preferably moulded as a single part (in a single step, after which a one-piece tank is obtained, without recourse to an additional step of assembling separate shells) from a split parison or a parison in at least two parts, and this generally by welding the slit or the two parts of the parison when the mould is closed. In particular, the tank is advantageously moulded by:

blow-moulding, i.e. by expanding the cut parison and pressing it against the mould cavities using a pressurized fluid (as described in Application EP 1110697 the content of which is, for this purpose, incorporated by reference in the present application);

thermoforming the parison, i.e. by pressing the latter against the mould cavities, for example by providing suction (creating a vacuum) behind said cavities.

Preferably, the tank is moulded by blow-moulding. This is because thermoforming generally involves heating the mould to 60° C. so as to be able to achieve deep deformations (corners of the tank for example, where the parison is highly stretched). This results in cycle times that are longer than with blow-moulding, in which this constraint does not exist.

During the process according to the invention, there is preferably a device that prevents the slit or the edges of the parts of the parison from being welded during a first closure of the mould (when the parison is pressed against the cavities in order to attach the accessories to the parison). This device is advantageously integrated into an insert having a suitable shape and size for being able to be partly (generally, over at least one part of its periphery) inserted between the parts of the parison to be welded (lips of the slit or edges of the two parts). To facilitate the welding, the mould cavities are advantageously equipped with a thermal control device that makes it possible to heat the weld zone during the steps relating to the first mould closure (in order to attach one or more components thereto), where appropriate.

This insert may also integrate such a (thermal control) device in its zone(s) of contact with the parison, and this being, in particular, in the aforementioned weld zone. This variant could further improve the quality of the welding of the tank (by reducing the inner bead and therefore by improving the impact resistance of the tank). Such a device is for example described in Application FR 04 13407 in the name of the Applicant, the content of which is, for this purpose, incorporated by reference into the present application.

The present invention also relates to equipment for implementing the process as described above. It relates more particularly to a die intended to be mounted on the head of an extruder delivering a stream of cylindrical material, said die having, for this purpose, a passage for said stream of which the cross section is annular at the inlet (i.e. on the side where the cylindrical stream exiting the extrusion head enters into the die) and is flattened at the outlet (i.e. on the side where the stream of molten plastic exits the die). This passage is preferably delimited by two separate parts: on the one hand, by a central part or core (generally attached to the extrusion head by means of a core guide), which is in direct contact with the inner surface of the parison, and on the other hand, by an outer part, or mantle, which is in direct contact with the outer surface of the parison.

Such a die has the advantage of being easily mountable on (and demountable from) a conventional extrusion head.

According to one preferred variant, this die comprises at least one flow divider which interrupts the passage for the molten material at a given moment and this preferably up to the outlet of the die. This flow divider is therefore capable of splitting the cylindrical stream so as to obtain a split parison. Most particularly preferably, the die according to this aspect of the invention comprises two flow dividers positioned in a diametrically opposed manner in the passage, and this so as to separate the parison into two parts along two opposing generatrices. Therefore, for ease in the remainder of the description, mention will be made of two flow dividers, but it is understood that the invention is not limited to this particular case.

It is particularly advantageous that the flow dividers be positioned just before the place where the annular passage changes shape in order to flatten out. And as already mentioned above, it is moreover particularly advantageous that these flow dividers be extended to the outlet of the die and have a suitable shape for keeping the cut parison parts separated, or even increasingly separated. According to one particularly advantageous variant, in the die according to the invention, the flow dividers have a suitable shape and location to contribute, with the shape of the passage through the die, to converting the two semi-cylinders into substantially flat sheets. Most particularly preferably, it also makes it possible to separate said sheets by the distance required for their direct insertion into the mould cavities.

The flow dividers of the die according to the invention may have any shape. Generally, they have a sharp edge pointing towards the die inlet and opening out towards the die outlet and this so as to keep the cut parison parts well separated. They are attached to said die in any known manner. Preferably, they are firmly attached to a fixed part in the die (generally, the mantle), and the moveable part(s) with which this fixed part determines a passage of variable thickness (generally, the core or a part firmly attached to it) is provided with a slit into which the "inactive" part of the flow divider (that which does not participate in cutting the parison) may be inserted in a leaktight manner. The sealing of this insertion is assured in any known manner, preferably by adapting the respective mechanical tolerances of the various parts to within a $10^{th}$ of a μm.

Most particularly preferably, and as mentioned previously, the die according to the invention preferably comprises a device for controlling the thickness of the parison and/or a device for transversely cutting the parison.

As regards the device for controlling the thickness of the parison, it is preferably a "die slide" (part inserted locally into the die) as described in U.S. Pat. No. 5,057,267 in the name of the Applicant and of which the content is, for this purpose, incorporated by reference in the present application. Although this is specific to modifying the thickness of a cylindrical parison, in the variant of the invention according to which this parison is separated into two flat sheets within the die itself, it is advantageous that this modification take place on the flat outlet sub-dies. Therefore, preferably incorporated at the level of the outlet slits of the die according to this variant of the invention (illustrated by FIG. 5 appended to the present document), are moveable blocks that make it possible to locally modify the thickness.

BRIEF DESCRIPTION OF THE DRAWINGS

The objective of FIGS. 1 to 5 is to illustrate certain concrete aspects of the invention, without wishing to restrict the scope thereof in any way. FIGS. 1 to 3 illustrate a die which, contrary to the subject of the invention, does not modify the shape of the parison but on the other hand allows it to be cut.

In these figures, identical numbers represent identical components, namely:

1. the mantle of the die;
2. its core;
3. the core guide; and
4. a flow divider.

DETAILED DESCRIPTION OF THE INVENTION

Figure 4:
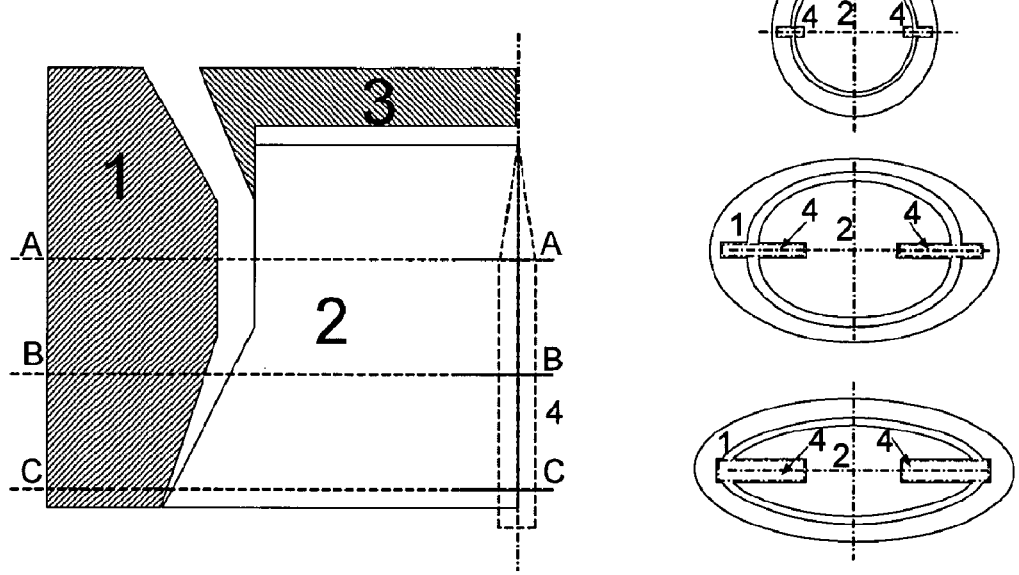
FIGS. 4 and 5 illustrate dies which make it possible to form a respectively cylindrical or oblong parison, and to cut it and convert it into two separate flat sheets.
Figure 5:
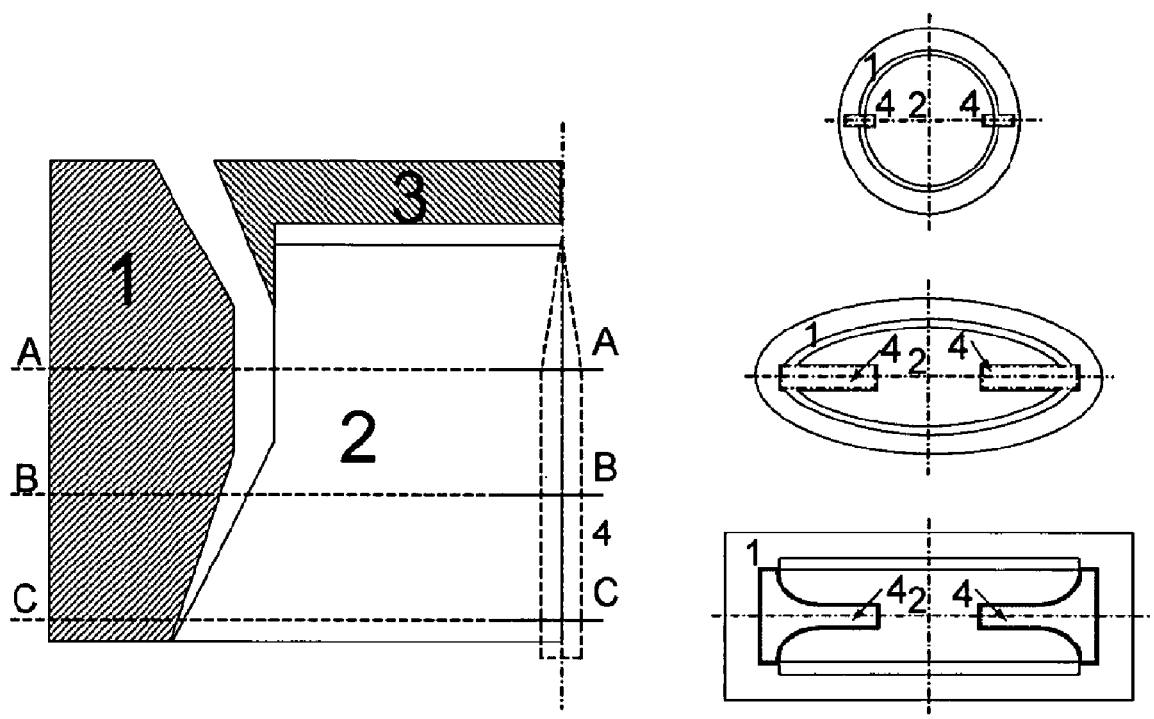

FIG. 1 illustrates the left half of a longitudinal cross section (in a plane including its axis, which is shown in the figure as a dotted line) in a die according to the invention. This die is symmetrical. FIG. 2 illustrates an axial cross section (through a plane perpendicular to the plane of the preceding cross section) through the flow divider (4) alone and FIG. 3 illustrates a bottom view of the die from FIG. 1. In FIGS. 4 and 5 (which illustrate two dies according to two different variants of the invention), these various cross sections have been combined. The devices which are illustrated therein are equipped with a device that makes it possible to vary the thickness of the parison and to cut it. The right-hand side views are obtained by the device having turned 90° with respect to the left-hand side views. Moreover, the left-hand side views illustrate the system in the process of being cut transversely (specifically, there is no longer a passage for the material at the bottom), and the right-hand views illustrate the device in the midst of extruding and flattening the parison according to the invention.

From FIG. 1 it can be seen that the core (2) comprises a triangular protuberance indicated by a dotted line at the bottom of the die and provided with a slit into which the flow divider (4) may slide. FIG. 2 shows the edge of the flow divider and its widening profile. And in FIG. 3, it can be seen how the flow divider, integrated into the mantle (1), may also slide into a slit made in the core (2). In these figures, a cylindrical parison is cut into two parts which must then be flattened before being introduced into a mould (not shown) in order to be shaped. Due to its widening geometry (see FIG. 2 and successions of cuts in FIG. 4), the flow divider separates the streams (parison parts) effectively.

This widening geometry is also present in the flow dividers of the dies illustrated in FIGS. 4 and 5 (where 3 transverse cuts, made at the different levels indicated in these figures, are illustrated). It is possible to see therein the change in the shape of the passage for the molten material, which in the die from FIG. 4, has a cross section which gradually becomes oblong and in the die from FIG. 5, a cross section which is gradually reduced at two parallel slits, the cross section of the flow divider having a shape which also changes longitudinally to "push back" the edge of the sheets and to straighten them.

The invention claimed is:

1. A process for manufacturing a plastic hollow body, the process comprising the following steps:
    extruding a molten plastic parison, in an extruder, through a die;
    cutting at least one longitudinal cut in the parison;
    introducing the parison into a mold that includes two cavities; and
    molding the hollow body by conforming the parison to the mold cavities, the die including a passage for the molten plastic parison which gradually modifies a shape of the parison so that the parison is substantially flattened on exiting,
    wherein a sheet-like free end of the longitudinally cut parison hangs by gravity between the mold cavities and is gripped and flattened by a device so as to prevent formation of bends in the parison or warping of the parison, the parison being longitudinally cut prior to the sheet-like free end of the parison being gripped and flattened,
    wherein the longitudinal cutting of the parison is carried out in the die,
    wherein the parison is longitudinally cut using flow dividers which extend to the die outlet and which have a shape and location to contribute, with a shape of the passage through the die, to converting the parison into two substantially flat sheets,
    wherein the mold cavities are positioned underneath the die,
    wherein the parison is extruded continuously between the cavities of the mold,
    wherein the mold is closed just before transversely cutting and molding the parison, and
    wherein the sheet-like free end of the longitudinally cut parison includes a pair of sheet-like free ends that are gripped and flattened by the device.

2. The process according to claim 1, wherein a thickness of the parison is controlled using a device integrated into the die.

3. The process according to claim 1, wherein, before molding the hollow body, at least one accessory is attached to an inside of the parison and onto an inner face of the parison.

4. The process according to claim 1, wherein the die includes a device enabling the transverse cutting of the parison.

5. The process according to claim 4, wherein the die includes a core and a mantle, and
    wherein the transverse cutting occurs via relative movement of the core and the mantle.

* * * * *